UNITED STATES PATENT OFFICE.

SAMUEL JOSEPH COXETER AND HEINRICH NEHMER, OF 23 GRAFTON STREET EAST, COUNTY OF MIDDLESEX, ENGLAND.

PROCESS OF MAKING PLATES OR MASSES OF CARBON.

SPECIFICATION forming part of Letters Patent No. 325,822, dated September 8, 1885.

Application filed July 7, 1884. (No specimens.) Patented in England May 22, 1884, No. 8,083; in France May 30, 1884, No. 162,472, and in Germany June 1, 1884, No. 30,042.

*To all whom it may concern:*

Be it known that we, SAMUEL JOSEPH COXETER and HEINRICH NEHMER, of 23 Grafton Street East, in the county of Middlesex, in England, have invented a Composition of Matter for Elements in Electrical Batteries and for other Purposes, of which the following is a description.

In carrying out our invention of a method of obtaining solidified compositions of matter for elements in electrical batteries and for other purposes, we mix carbon alone, or carbon and peroxide of manganese, or other similar substance or substances that give off oxygen, with silicate of potash or silicate of soda, or any other alkaline silicate or silicates, so that the compound forms a pasty mass. This compound is then dried and immersed in a solution of a chloride, sulphate, nitrate, or other salt of ammonium, or in any acid that will have the effect of decomposing the alkaline silicate in the compound, so that the alkali of the silicate may be removed by the salt of ammonium or acid used, and the silica be precipitated intimately among the particles of the carbon, peroxide of manganese, or other such substances employed. The compound is then boiled in water, which dissolves out of it everything but the carbon, peroxide of manganese, or other similar substances and the silica. After this the compound is dried, and is then fit for use; and we term the solidified composition so obtained "silico carbon."

In order more clearly to explain the method of carrying out our invention in practice, we will now proceed to describe more particularly our process of forming solidified compositions of matter with certain of the various substances hereinbefore enumerated.

Such method is as follows: We take carbon, in the state of powder or small particles, and mix it with silicate of potash till the whole becomes a pasty mass. This pasty mass is then formed into any suitable shape by means of a mold or otherwise, without the use of hydraulic or other artificial pressure, and afterward dried by exposure to a tolerably-warm atmosphere. When dry, it is immersed in a solution of chloride of ammonium, with the result that decomposition takes place, the ammonia is liberated, and the chlorine combines with the potassium of the potassium silicate. Part of the liberated ammonia is given off in the form of gas, and part remains in solution throughout the mass. The potassium chloride also remains in solution in the mass, while the silica is precipitated *in situ* as a gelatinous material, and therefore as the potassium silicate was originally intimately mixed with the carbon, the silica now holds or cements the carbon particles thoroughly together.

In order to dissolve out the potassium chloride and the ammonia, the mass is boiled in water, after which, as a final operation, it is thoroughly dried, and is then fit for use.

We wish it to be understood that the method last described is only given as a general illustration of our process.

Solidified compositions of matter, consisting of the materials hereinbefore specified, are principally adapted for use as elements in electrical batteries, but may be employed for various electrical, filtering, and other purposes.

In order to form efficient means of connection for electrical purposes with our solidified masses of carbon, we may deposit copper, lead, or other metal upon them; or we may place platinum, in the form of wire or any other suitable shape, in the molds into which the pasty mixture is placed, so that the platinum is thoroughly embedded in the molded mass.

Having thus described our invention, what we claim as new is—

The method of obtaining solidified compositions of matter, consisting of carbon and silica, by first mixing the carbon with an alkaline silicate to form a pasty mass, drying the same, then immersing the dried mass in a solution that will decompose and remove the alkaline silicate in the compound and precipitate the silica intimately among the particles of the carbon, then boiling the composition in water, and finally drying the mass.

The foregoing specification of our new method of obtaining solidified masses of carbon, which we term "silico carbon," for electrical and other purposes, signed by us this 28th day of May, 1884.

SAMUEL JOSEPH COXETER. [L. S.]
  HEINRICH NEHMER. [L. S.]

Witnesses:
  AMBROSE MYALL,
  W. HILLIER,

*Both of* 21 *Cockspur St., Charing Cross, London, S. W.*